US009392100B2

(12) United States Patent
AlHazme

(10) Patent No.: US 9,392,100 B2
(45) Date of Patent: Jul. 12, 2016

(54) EMERGENCY ASSISTANCE REQUESTING DEVICE

(71) Applicant: Raed H. AlHazme, Florham Park, NJ (US)

(72) Inventor: Raed H. AlHazme, Florham Park, NJ (US)

( * ) Notice: Subject to any disclaimer, the term of this patent is extended or adjusted under 35 U.S.C. 154(b) by 481 days.

(21) Appl. No.: 13/927,795

(22) Filed: Jun. 26, 2013

(65) Prior Publication Data

US 2015/0004926 A1    Jan. 1, 2015

(51) Int. Cl.

| H04M 11/04 | (2006.01) |
| H04M 1/725 | (2006.01) |
| G06F 3/048 | (2013.01) |
| H04M 3/00 | (2006.01) |
| H04M 3/42 | (2006.01) |

(Continued)

(52) U.S. Cl.
CPC ........... *H04M 1/72541* (2013.01); *G06F 3/048* (2013.01); *H04L 67/18* (2013.01); *H04L 67/306* (2013.01); *H04M 1/72538* (2013.01); *H04M 3/00* (2013.01); *H04M 3/42068* (2013.01); *H04M 3/5116* (2013.01); *H04L 67/22* (2013.01); *H04L 67/322* (2013.01); *H04M 2203/406* (2013.01); *H04M 2203/551* (2013.01); *H04M 2242/30* (2013.01); *H04W 4/02* (2013.01); *H04W 4/22* (2013.01)

(58) Field of Classification Search
CPC ... G08B 25/016; H04M 11/04; H04W 76/007
USPC ........................................... 455/404.1, 404.2
See application file for complete search history.

(56) References Cited

U.S. PATENT DOCUMENTS

| 6,807,564 B1 | 10/2004 | Zellner et al. |
| 7,466,218 B2 | 12/2008 | Oesterling |

(Continued)

FOREIGN PATENT DOCUMENTS

| JP | 4466409 B2 | 5/2010 |
| WO | WO 2009/114940 A1 | 9/2009 |

OTHER PUBLICATIONS

Andrzej Podziewski, et al., Emergency Button—a Telco 2.0 application in the e-health environment, Proceedings of the Federated Conference on Computer Science and Information Systems pp. 663-667, ISBN 978-83-60810-51-4, IEEE 2012.

*Primary Examiner* — Rafael Perez-Gutierrez
*Assistant Examiner* — Joshua Schwartz
(74) *Attorney, Agent, or Firm* — Oblon, McClelland, Maier & Neustadt, L.L.P.

(57) ABSTRACT

An emergency assistance requesting device that enhances an efficiency of emergency assistance request that includes a user interface that is configured to receive an input, a user interface that is configured to receive an input, a non-transitory storage device that stores emergency request information, geographical location information of the emergency assistance requesting device, information corresponding to plurality of emergency centers, a user profile and history data. A communication unit is included that communicates with the plurality of emergency centers and processing circuitry is included that (1) determines an emergency center from the plurality of emergency centers to communicate with (2) retrieves the emergency request information, the geographical location information of the emergency assistance requesting device, the information corresponding to the emergency center determined to communicate with, the user profile and the history data, and (3) determines whether to transmit based on the confidence level.

20 Claims, 12 Drawing Sheets

(51) Int. Cl.
  *H04M 3/51* (2006.01)
  *H04W 4/02* (2009.01)
  *H04L 29/08* (2006.01)
  *H04W 4/22* (2009.01)

(56) References Cited
  U.S. PATENT DOCUMENTS

| | | | |
|---|---|---|---|
| 2002/0052539 A1* | 5/2002 | Haller | A61B 5/0031 600/300 |
| 2008/0261557 A1* | 10/2008 | Sim | H04W 4/001 455/404.2 |
| 2009/0284348 A1* | 11/2009 | Pfeffer | G08B 25/006 340/7.3 |
| 2011/0081884 A1 | 4/2011 | Sennett et al. | |
| 2012/0254263 A1 | 10/2012 | Hiestermann et al. | |
| 2012/0303272 A1 | 11/2012 | Studzinski | |

* cited by examiner

US 9,392,100 B2

EMERGENCY ASSISTANCE REQUESTING DEVICE

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

Field of the Disclosure

The present disclosure relates to an emergency assistance requesting device, and more particularly, relates to an emergency assistance requesting device that enhances emergency assistance request.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Among other things, the present disclosure provides an emergency assistance requesting device to enhance the efficiency of an emergency assistance request. In one example embodiment, the emergency assistance requesting device includes a user interface that is configured to receive an input by a requester; a memory that stores an emergency request information, geographical location information of the emergency assistance requesting device, and additional information corresponding to plurality of emergency centers; a communication unit that communicates with the plurality of emergency centers; and processing circuitry that is configured to (1) determine an emergency center to communicate with from the plurality of emergency centers based on the input by the requester from the user interface, (2) retrieve, from the memory, the emergency request information, geographical location information of the emergency assistance requesting device, and additional information concerning the emergency nature corresponding to the emergency center input by the requester, and (3) control the communication unit to transmit the emergency request information, the geographical location information, and the additional information concerning the emergency nature corresponding to the emergency center input by the requester to the emergency center.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
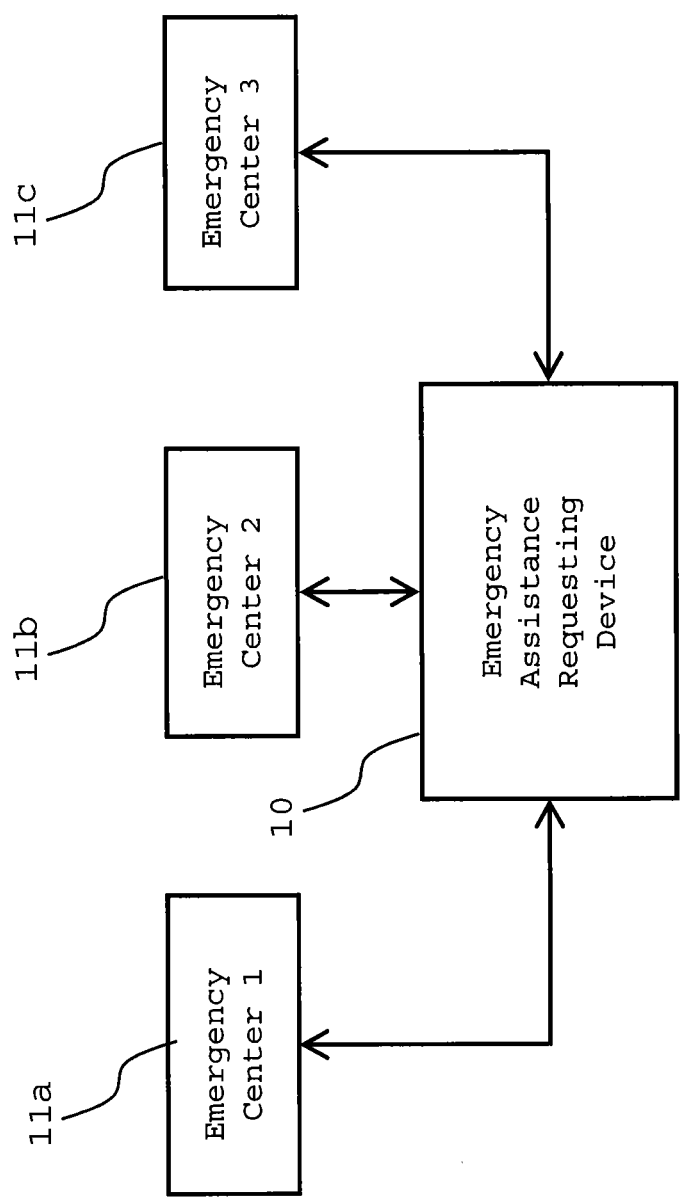
FIG. 1 is an exemplary emergency assistance requesting system according to one embodiment.

Referring now to the drawings, wherein like reference numerals designate identical or corresponding parts throughout the several views, FIG. 1 is an exemplary embodiment of emergency assistance requesting system according to one embodiment. For example, emergency assistance requesting device (EARD) 10 may be located in the house of an emergency assistance requester who sends emergency assistance request to emergency center 1 (11*a*), 2 (11*b*) and 3 (11*c*). Depending on the input by the requester, an emergency assistance request is sent to either one or plurality of emergency center 1, 2 and/or 3 through, for example, Internet connections (e.g., fiber, cable, etc.), telephone lines or wireless links. For example, emergency center 1 (11*a*), 2 (11*b*) and 3 (11*c*), respectively, may be a police department, a fire department and/or an emergency medical service.

Figure 2:
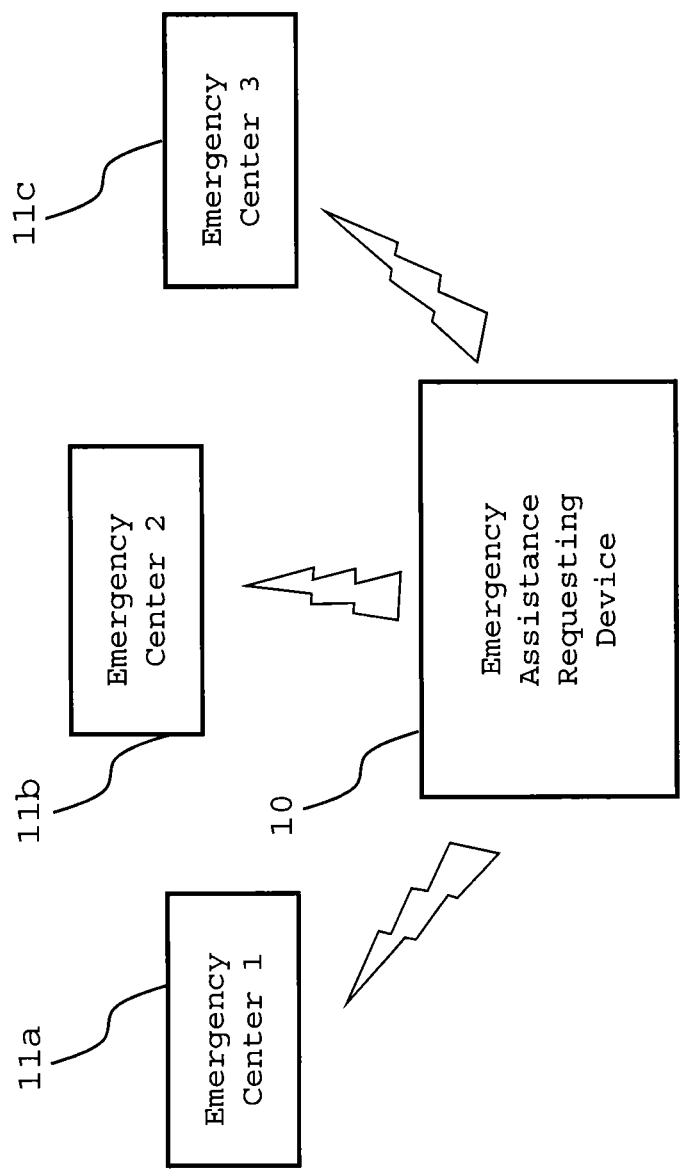
FIG. 2 is another exemplary embodiment of an emergency assistance requesting system.

FIG. 2 is an exemplary embodiment of emergency assistance requesting system according to another embodiment of the present application. In this example, EARD 10 may be for portable use and a requester may carry the device with him. In another embodiment, the EARD 10 may be installed in a single place, for example, at a house. When the requester inputs an emergency assistance request to the EARD 10, the request signal is sent to either one or plurality of emergency center 1, 2 and/or 3 through, for example, wireless links. The connection may be wired or wireless. For example, emergency center 1 (11*a*), 2 (11*b*) and 3 (11*c*) respectively may be a police department, a fire department and an emergency medical service, or any similar entity responsible for emergency situation. Alternatively, the emergency center may be a friend or a family member of the user.

Figure 3:
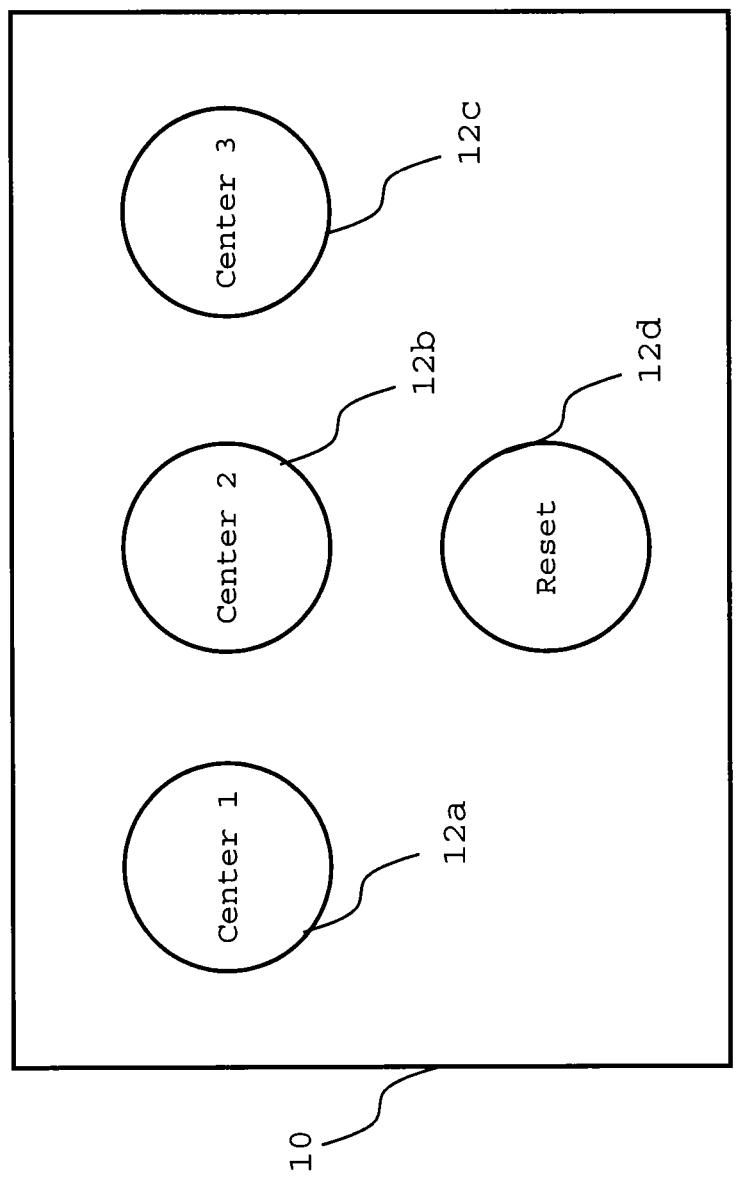
FIG. 3 is an exemplary embodiment of a user interface of an emergency assistance requesting device.

FIG. 3 is an exemplary embodiment of a user interface of an emergency assistance requesting device. The requester can select which emergency center to transmit the emergency request signal from the user interface of the EARD 10. For example, mechanical push buttons 12*a*, 12*b* and 12*c* are disposed on the EARD 10 and the requester can select which emergency center to transmit the emergency request signal by pushing the button corresponding to the emergency center to which he wants to send a request. The requester may cancel the selection by pushing the reset button 12*d*. As described below, this user interface need not be mechanical button but can be implemented in various ways. For example, these buttons 12 *a*, 12*b*, 12*c* and 12*d* may be displayed and operated on a touch-screen display or displayed on a screen and selected and actuated using a mouse or other pointing device.

Figure 4:
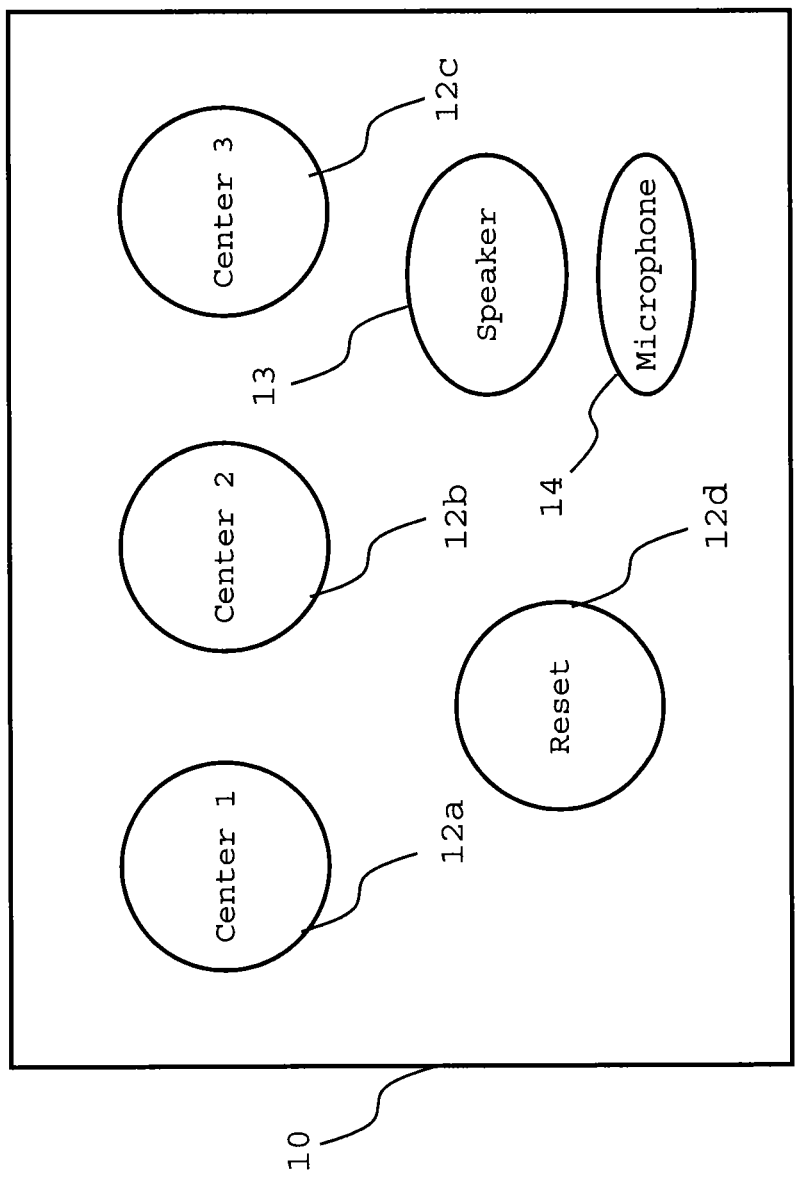
FIG. 4 is an exemplary embodiment of a user interface of an emergency assistance requesting device with a speaker and microphone.

FIG. 4 is an exemplary embodiment of a user interface of an emergency assistance requesting device with a speaker and microphone. In this example, a speaker 13 and a and microphone 14 are further implemented to the EARD 10. As described below, in this example, the requester may select which emergency center to send request by speaking the name of the emergency center to the microphone 14. After the requester sent the request to the emergency center, he may also communicate with the emergency center through the speaker 13 and the microphone 14. A voice processing module (processing circuitry that recognizes voice commands and coverts them into electrical signals) may be used to determine which emergency center the user intends to reach.

Figure 5:
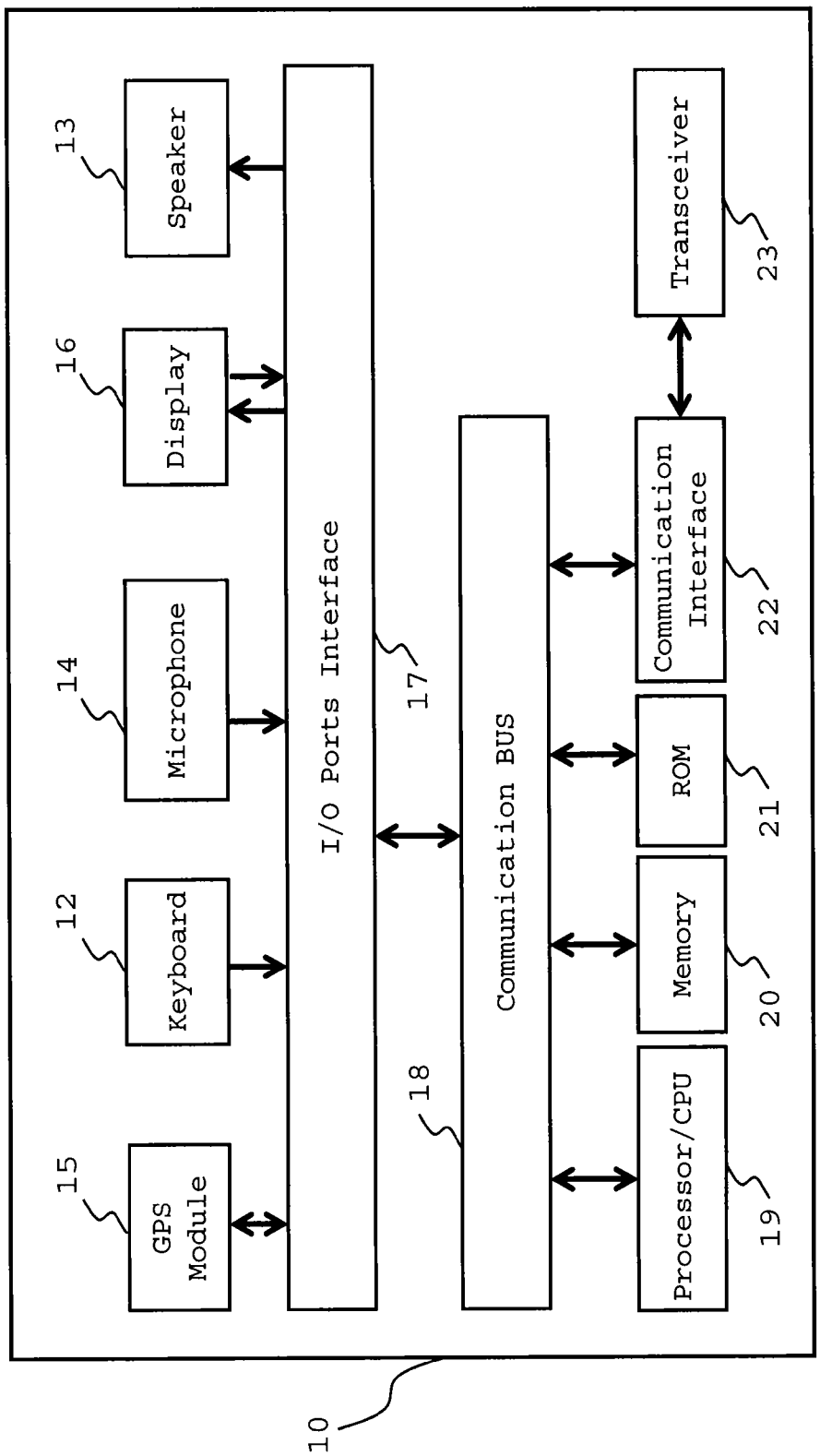
FIG. 5 is an exemplary block diagram of an emergency assistance requesting device.

In one exemplary embodiment, once an emergency center is selected to send a request and input from the user interface is detected, after a predetermined period time (e.g. 10 seconds or time taken for transmitting internal control signal between the microphone 14 and a processor/CPU 19 in FIG. 5), the microphone 14 may be turned on by the processor/CPU 19 so that an operator in the emergency center input from the user interface can listen to the voices or sounds around the EARD 10. In this way, the operator in the emergency center may interpret the emergency situation from the voices or sounds from the EARD 10 and respond adequately even though the requester cannot communicate with the operator due to the emergency situation.

FIG. 5 is an exemplary block diagram of the EARD 10. EARD 10 includes a user interface, such as keyboard 12, microphone 14 and display 16 from which a requester can select an emergency center to communicate with from a plurality of emergency centers and provide information to the processor/CPU 19. For example, a requester can select an emergency center 1 by pushing a button from a plurality of buttons in the keyboard 12. Each buttons may be labeled with the name of the emergency center so that a requester can identify which button corresponds to which emergency center. The user interface may be a pointing device (not shown), such as a mouse, a trackball, or a pointing stick for communicating direction information and command selections to the processor/CPU 19 and for controlling cursor movement on the display 16, such as a cathode ray tube (CRT) or a liquid crystal display (LCD), for displaying information to a requester. In another example, a requester may select an emergency center 1 by touching a button or icon displayed on the display 16 and a touch input device (such as capacitance sensor, infrared radiation sensor or electromagnetic induction sensor) implemented to the display 16 detects the touch by the requester. In yet another example, a requester can select an emergency center 1 by speaking the name of the emergency center 1 to the microphone 14. Keyboard 12, microphone 14 and display 16 are connected to I/O ports interface 17. I/O ports interface 17 sends and receive information from and to the user interface and it may include logic to interpret the device address generated by the processor/CPU 19. I/O ports interface 17 may also include a hand-shaking logic so that the processor/CPU 19 can communicate with an I/O device (such as GPS Module 15, keyboard 12, microphone 14, display 16 or speaker 13) through the interface. I/O ports interface 17 is also connected to communication BUS 18. Communication BUS 18 is also connected to processor/CPU 19, memory 20, ROM 21 and communication interface 22. Communication BUS 18 stores information and instructions to be executed by the processor/CPU 19 and manages the signal transaction between each component in the EARD 10. Communication BUS 18 may include a data bus to carry information, an address bus to determine where the information should be sent and a controls bus to determine its operation.

Processor/CPU 19 executes one or more sequences of one or more instructions contained in a memory, such as memory 20. Such instructions may be read into the memory 20 from another computer readable medium, such as a hard disk or removable media drive. One or more processing circuitries in a multi-processing arrangement may also be employed to execute the sequences of instructions contained in memory 20. In alternative embodiments, hard-wired circuitry may be used in place of or in combination with software instructions. Thus, embodiments are not limited to any specific combination of hardware circuitry and software.

As stated above, the EARD 10 includes at least one non-transitory computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read.

Stored on any one or on a combination of computer readable media, the present disclosure includes software for controlling the EARD 10. Such software may include, but is not limited to, device drivers, operating systems, development tools, and applications software. Such computer readable medium further includes the computer program product of the present disclosure for performing all or a portion (if processing is distributed) of the processing performed in implementing the disclosure.

The computer code devices of the present disclosure may be any interpretable or executable code mechanism, including but not limited to scripts, interpretable programs, dynamic link libraries (DLLs), Java classes, and complete executable programs. Moreover, parts of the processing of the present disclosure may be distributed for better performance, reliability, and/or cost.

The term "computer readable medium" as used herein refers to any non-transitory medium that participates in providing instructions to the processor/CPU 19 for execution. A computer readable medium may take many forms, including but not limited to, non-volatile media, volatile media, and transmission media. Non-volatile media includes, for example, optical magnetic disks, and magneto-optical disks, such as the hard disk or the removable media drive. Volatile media includes dynamic memory, such as the memory 20. Transmission media includes coaxial cables, copper wire and fiber optics, including the wires that make up the communication bus 18. Transmission media may also take the form of acoustic or light waves, such as those generated during radio wave and infrared data communications.

Various forms of computer readable media may be involved in carrying out one or more sequences of one or more instructions to processor/CPU 19 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the EARD 10 may receive the data on the phone line and use an infrared transmitter to convert the data to an infrared signal. An infrared detector coupled to the communication bus 18 can receive the data carried in the infrared signal and place the data on the communication bus 18. The communication bus 18 carries data to the memory 20, from which the processor/CPU 19 retrieves and executes the instructions. The instructions received by the memory 20 may optionally be stored on storage device either before or after execution by processor/CPU 19.

Processor/CPU 19 receives input signal from the user interface (such as keyboard 12, microphone 14, pointing device (not shown) and/or a display 16) and judges which emergency center was selected by the requester from the user interface. For example, if keyboard 12 is used as a user interface, the processor/CPU 19 determines which button from plurality of buttons was pushed and determines which emergency center was selected by the requester. If microphone 14 is used as a user interface, processor/CPU 19 executes voice recognition algorithm and determines which emergency center was spoken by the requester. If display 16 is used as a user interface, processor/CPU 19 determines which emergency center displayed on the display 16 was touched by the requester based on the input signal from the touch input device implemented to the display 16.

For example, in determining to which emergency center EARD 10 should send an emergency assistance request, the processor/CPU 19 may also take into account a user profile and history data which may be stored in the memory 20 in addition to the input signal from the user interface.

(A User Profile) A user profile is profile information of the requester (e.g., name, physical characteristics, age, sex, criminal history, medical history, family information, marital status, address, phone number, etc.) and it may be stored in the memory 20. A user profile may also be stored in a memory 40 of an emergency assistance request receiving device 30. A user profile may include priority information.

(Priority Information) Emergency assistance request receiving device 30 may prioritize plurality of emergency assistance requests from plurality of EARD 10 based on each of priority information transmitted from each of the EARD 10, and respond to each of requesters in the order based on the prioritization. For example, priority information may include information on special needs of a requester and prioritization may be done based on the index assigned for each of the special needs. The information on special needs may be, such as "A requester has a premature baby", "A requester is a senior citizen with a medical problem", "A requester has dementia", "A requester is hearing-impaired", "A requester is visually impaired", etc. and for these special needs high priority index may be assigned. For example, the information on special needs such as "A requester is hearing-impaired" may be assigned higher priority index than the information "A requester has a premature baby". On the other hands, information such as "A requester has obtained a restraining order from a court" may be assigned low priority index. In this case, the priority index may change according to the type of crime committed by the requester or the time period from when the restraining order was put in place by the court. Therefore, if an emergency center receives three emergency assistance requests, each of which includes priority information of "A requester has a premature baby", "A requester is hearing-impaired" and "A requester has obtained a restraining order from a court", at about the same timing, the emergency center may decide the order to respond to each of the requests based on the priority index assigned to each of the priority information and respond to a requester who sent the priority information "A requester is hearing-impaired" the first, a requester who sent the priority information "A requester has a premature baby" the second, and a requester who sent the priority information "A requester has obtained a restraining order from a court" the third. The priority index may also be assigned a prioritization time and an emergency assistance request receiving device 30 may determine the order to respond to each of requests based on both the prioritization time and the time when an emergency assistance request comes. For example, the priority information "A requester is hearing-impaired" may be assigned 15 seconds as a allowable respond time and the priority information "A requester has a premature baby" may be assigned 60 seconds as a prioritization time. In this case, if an emergency assistance request including priority information "A requester has a premature baby" comes at 3:30:30 PM, and an emergency assistance request including priority information "A requester is hearing-impaired" comes at 3:30:45 PM, the emergency assistance request receiving device 30 may compare each of the time after adding each of the allowable respond time (3:31:30 PM (3:30:30 plus 60 seconds) v.s. 3:31:00 PM (3:30:45 plus 15 seconds)) and determine that an emergency center should respond to the emergency assistance request including priority information "A requester is hearing-impaired" earlier than the emergency assistance request including priority information "A requester has a premature baby".

(History Data) History data includes information on a requester's emergency assistance request history. History data may include information on number of false, mistake or non-emergency request of a requester in the past. History data may also include information on when and what kind of requests were made.

(Confidence Level) History date may include a confidence level regarding whether an emergency assistance request (request message) is to be sent in response to receiving emergency assistance request input from the user interface. For example, if a requester made three non-emergency requests in the past, the confidence level may be set low. On the other hand, if a requester has not made false, mistake nor non-emergency request in the past, the confidence level may be set high. The confidence level may be calculated by a processor/CPU 19 or a processor/CPU 39 based on the history data. For example, the confidence level may be calculated as follows using six parameters:

$k/\{(x*wx+y*wy+z*wx)+1\}$, where x is number of false requests made by requester, wx is weight of the false requests, y is number of mistake requests made by requester, wy is weight of mistake requests, z is number of non-emergency requests made by requester, wz is weight of non-emergency requests, and k is any constant number (e.g. 1000).

In this example, the confidence level has a scale between 0 and k (e.g. 1000). The highest confidence level may be assigned k (e.g. 1000) and the lowest confidence level may be assigned 0. The weight of false, mistake, non-emergency requests assist in determining how the order of requests is managed.

History data may also be used by the emergency center to prioritize emergency requests from a plurality of requesters. Therefore, it is preferable that processor/CPU 19 controls memory 20 so that the history data is stored in the region of memory 20 where a requester cannot modify it.

Before determining to which emergency center EARD 10 should send an emergency assistance request, the processor/CPU 19 may determine whether or not EARD 10 should send an emergency assistance request to an emergency center based on the confidence level and a predetermined level which may be stored in the memory 20. If the processor/CPU 19 determines that the confidence level is above the predetermined level, the processor/CPU 19 controls a communication unit to transmit emergency request information, geographical location information of the EARD 10, additional information corresponding to the selected emergency center, a user profile, and history data to an emergency center. For example, if the confidence level is calculated to be 800 based on the formula described above, and the predetermined level is set to be 500, emergency request information may be determined to be transmitted by the processor/CPU 19.

The emergency center to send above information and communicate with is determined by the processor/CPU 19 based on an input from the user interface, a user profile, and history data. For example, even if a requester input a police department as an emergency center to communicate with, if priority information in the user profile indicates that "A requester is a senior citizen with a medical problem", the processor/CPU 19 may determine an emergency medical service, or both an emergency medical service and a police department as an emergency center to communicate with. In another example, even if a requester input a police department as an emergency center to communicate with, if the history data indicates that the requester has made five false requests misunderstanding a police department for an emergency medical service, the processor/CPU 19 may determine an emergency medical service, or both an emergency medical service and a police department as an emergency center to communicate with.

On the other hand, if the processor/CPU 19 determines the confidence level is below the predetermined level, the processor/CPU 19 controls a communication unit to transmit a different message to a designated recipient that is not an emergency center. The different message may be such as "An emergency assistance request button "a police department" was pushed at 3:00 PM on Jun. 15, 2013." indicating the fact on which button was pushed and when it was pushed. The designated recipient may be such as the requester's family and the requester may set the recipient beforehand from the user interface. By sending the different message, even though the determination by the processor/CPU 19 not to send an emergency assistance request to an emergency center input by the requester was false, the designated recipient may compensate for the false determination and respond to the requester accordingly.

For example, if a requester pushes a reset button 12*d* after pushing one of emergency center buttons 12*a*, 12*b* or 12*c* within a predetermined period of time, an emergency assistance request may be cancelled. At the same time, this cancellation may affect the history data.

Then, for example, if processor/CPU 19 determines that emergency center 1 to contact, it retrieves following information stored in memory 20, which is connected to the communication BUS 18, from the memory 20: (i) emergency request information, (ii) geographical location information of the EARD 10, (iii) additional information corresponding to the emergency center 1 selected by the requester, (iv) a user profile, and (v) history data.

Memory 20 is any storage medium such as a random access memory (RAM) or other dynamic storage device (e.g., dynamic RAM (DRAM), static RAM (SRAM), and synchronous DRAM (SDRAM)), coupled to the communication bus 18 for storing information and instructions by the processor/CPU 19. In addition, the memory 20 may be used for storing temporary variables or other intermediate information during the execution of instructions by the processor/CPU 19.

The EARD 10 further includes a read only memory (ROM) 21 or other static storage device (e.g., programmable ROM (PROM), erasable PROM (EPROM), and electrically erasable PRM (EEPROM)) coupled to the communication bus 18 for storing static information and instructions for the processor/CPU 19.

(Emergency request information) Emergency request information is that which alerts the emergency center that emergency request is sent from a requester. It may include information to identify which emergency center was selected by the requester.

(Geographical location information) Geographical location information may include geographical location information of the requester, such as longitude and latitude information, geocode, address information or any other information by which an emergency center can identify the location of the requester. In one example, if EARD 10 is only for home use and not carried out of home by the requester, like the one in the embodiment shown in FIG. 1, 8 or 9, the geographical location information may be preset or preprogrammed in the memory 20 or ROM 20. In this example, a requester may set the information manually from the user interface when they first use EARD 10 (e.g. a requester may input address information by keyboard 12) or the information may be preset or preprogrammed in the factory and cannot be altered by the requester. In another example, if EARD 10 is for portable use and carried out of home by the requester, like the one in the embodiment shown in FIG. 2, 10 or 11, the geographical location information may be obtained by GPS module 15 connected to I/O ports interface 17. GPS module 15 obtains current geographical location information of the EARD 10 periodically (e.g. once every five seconds) and the information is periodically overwritten to memory 20.

(Additional Information) Additional Information is information based on an emergency nature and the additional information corresponds to each of an emergency center. Therefore, additional information can vary based on which emergency center was selected by a requester. A requester can preset the additional information beforehand by inputting information from the user interface such as keyboard 12. Or the communication unit can receive the additional information transmitted from emergency center 11*a*, 11*b* or 11*c*, or emergency station 9*a*, 9*b* or 9*c* and the additional information can be written in memory 20. For example, additional information corresponding to a police department and fire department may be information on home access methods, codes or community security guard contact information. Additional information corresponding to an emergency medical service may be information on requester's medical history, requester's physical information or requester's special needs. The EARD 10 also includes a communication interface 22 coupled to the communication BUS 18. The communication interface 22 provides a two-way data communication coupling to a network link (not shown) that is connected to, for example, a local area network (LAN), or to another communication network such as Internet. For example, the communication interface 22 may be a network interface card to attach to any packet switched LAN. As another example, the communication interface 22 may be an asymmetrical digital subscriber line (ADSL) card, an integrated services digital network (ISDN) card or a modem to provide a data communication connection to a corresponding type of communication line. Wireless links may also be implemented. In any such implementation, the communication interface 22 sends and/or receives electrical, electromagnetic or optical signals that carry digital data streams representing various types of information. The communication interface may be further connected to a transceiver 23.

The network link typically provides data communication through one or more networks to other data devices. For example, the network link may provide a connection to emergency center 1 (11*a*) through a local network (e.g. a LAN) or through equipment operated by a service provider, which provides communication services through a communications network. The local network and the communication network use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 22, which carry the digital data to and from the EARD 10 maybe implemented in baseband signals, or carrier wave based signals. The baseband signals convey the signal data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The EARD 10 can transmit and/or receive data, including program code, through the network(s), the network link and the communication interface 22.

Then processor/CPU 19 controls a communication unit, which may include transceiver 23, to transmit above three types of information (i) to (iii) to the emergency center which is judged by the processor/CPU 19 to be selected by the requester. The communication unit may include a phone instead of or in addition to the transceiver 23 to communicate with the emergency center by voice or data over a telephone line or a wireless or wired network. When a requester communicates with the emergency care center by voice over a telephone line through the communication unit, a microphone 14 is used to input requester voice and a speaker 13, connected to I/O ports interface 17, is used to output voice from a person in an emergency center. Transceiver 23 is connected to communication interface 22. Communication interface 22 is also connected to communication BUS 18 and the communication interface 22 may include logic to interpret the device address generated by the processor/CPU 19. Communication interface 22 may also include a hand-shaking logic so that the processor/CPU 19 can communicate with the communication unit through the interface.

In another example, Processor/CPU 19 also retrieves reliability index stored in memory 20 and controls the communication unit to transmit the reliability index to the emergency center selected by the requester.

Figure 6:
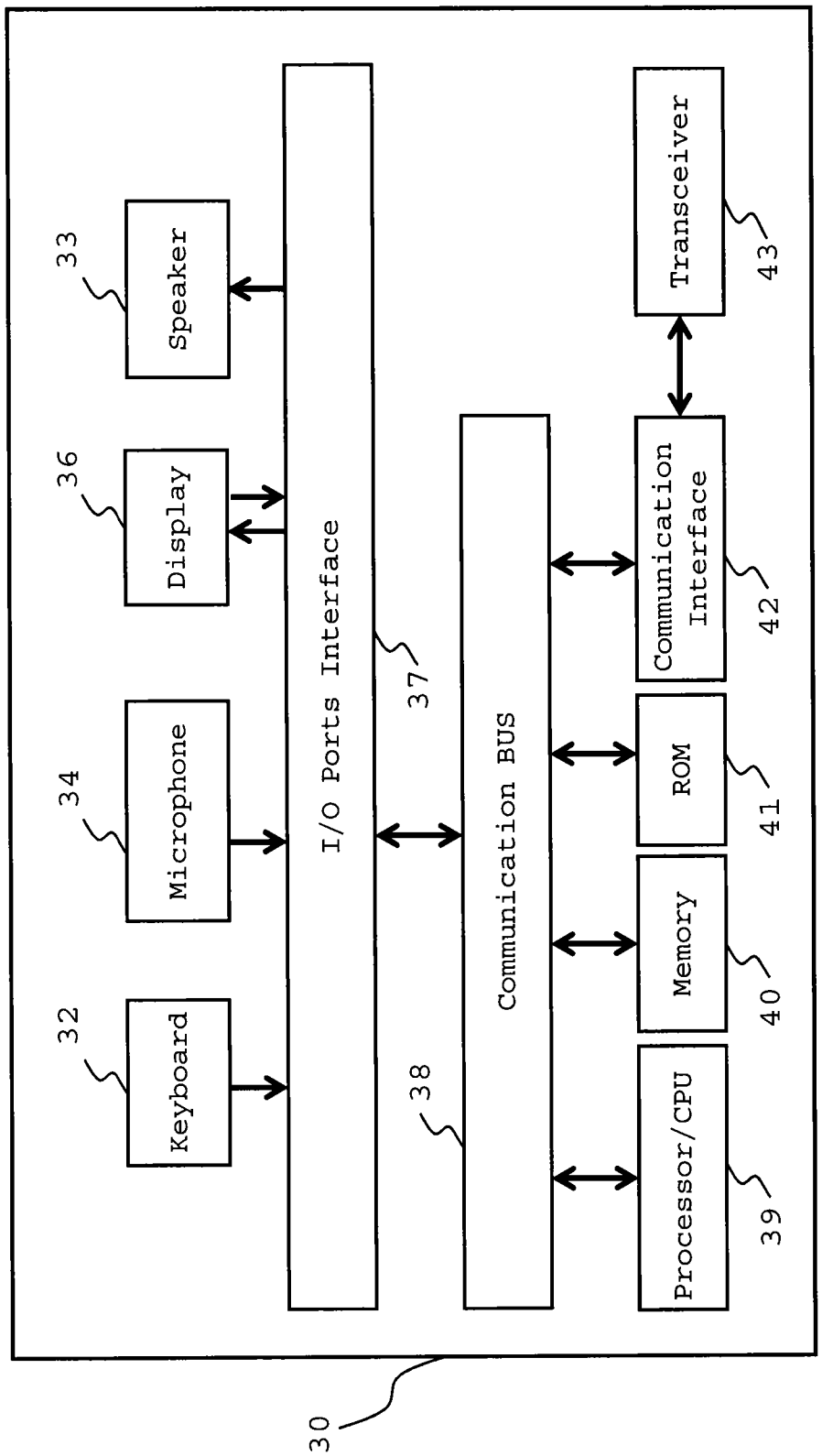
FIG. 6 is an exemplary block diagram of an emergency assistance request receiving device.

FIG. 6 is an exemplary block diagram of an emergency assistance request receiving device 30 (herein after referred to as "EARRD"). Many of the components perform a similar function to those described in FIG. 5. EARRD 30 is located in the emergency center 11a, 11b and 11c. EARRD 30 includes a user interface, such as keyboard 32, microphone 34 and display 36 from which an operator can input necessary information to, for example, communicate with the requester or send the request to the emergency station. Transceiver 43 receives the emergency request information, the geographical location information, the additional information, the user profile, and the history data sent from the EARD 10. The processor/CPU 39 may control the user interface to alert the operator that an emergency assistance request was sent from the EARD 10 when EARRD 30 received the request. For example, the processor/CPU 39 may control the display 36 to display the alert screen including identification information of the requester (e.g., name, phone number, or physical information), the geographical location information of the EARD 10, the additional information, the user profile, and the history data. The geographical location information may be displayed on a map.

Based on the alert screen, the operator may call back the EARD 10 to confirm the emergency and provide instructions through the transceiver 43. If the emergency request is determined to be invalid by the operator, the operator inputs from the user interface (e.g., keyboard 32) the information that the request from the EARD 10 is invalid. Based on the input from the operator, the transceiver 43 sends information indicating that the request was declined to the EARD 10. Then this information is memorized as records of the EARD 10 in the memory 20 and/or memory 40 and the records may affect the confidence level of the EARD 10. If the emergency request is determined to be valid, the operator inputs from the interface (e.g., keyboard 32) the information that the request from the EARD 10 is valid and this may also have an effect on the confidence level.

The operator may manually determine the closest emergency station to the EARD 10 based on the location of the EARD 10, or the processor/CPU 39 may calculate the closest emergency station to the EARD 10 based on the geographical location information received from the EARD 10. The processor/CPU 39 may also determine the emergency center to send the request by calculating which emergency stations satisfy the condition requested by the requester based on the additional information. Then, the processor/CPU 39 controls the transceiver 43 to send the request to the emergency station determined to be contacted.

In another example, the processor/CPU 39 may calculate the confidence level instead of the processor/CPU 19 based on the emergency assistance requesting history (e.g. number of false, mistake or non-emergency request) of the requester stored in the memory 40 or received from the EARD 10.

Figure 7:
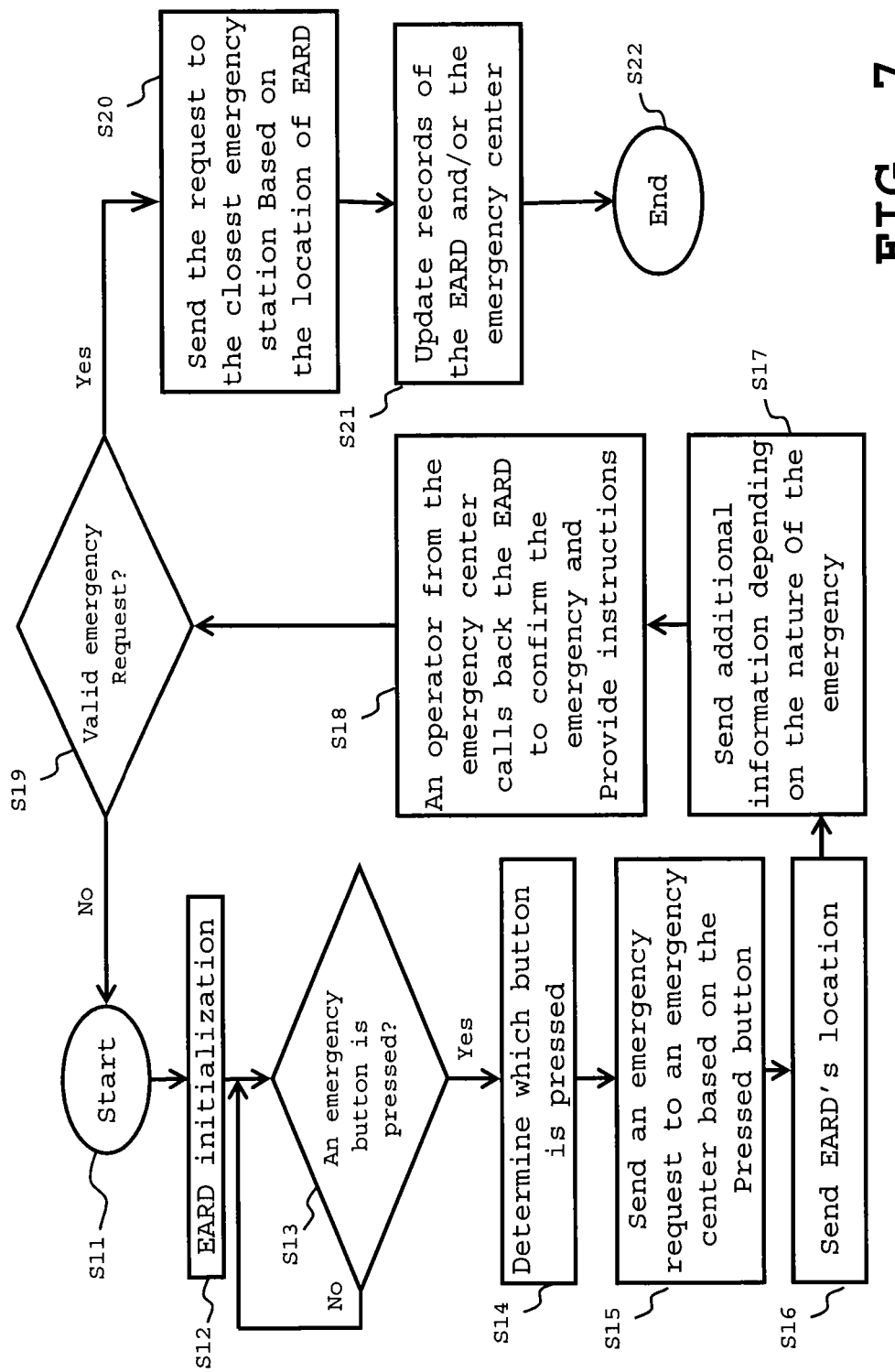
FIG. 7 is an exemplary flowchart of a method of an emergency assistance requesting system.

The processor/CPU 39 retrieves the priority information included in the user profile of plurality of requesters currently sending emergency assistance request from the memory 40 and prioritizes which requester to contact. The processor/CPU 39 may take into account both the priority information and the time when the emergency assistance request is sent to determine the order to contact. The processor/CPU 39 may calculate an allowable respond time based on the priority information in the user profile and control the display 36 to display the allowable time for operators. The processor/CPU 39 may also take into account the history data to determine the order to contact. The processor/CPU 39 may control the display 36 to display the contacting order of the requesters. Then the operator may contact the requesters in accordance with the order displayed. FIG. 7 is an exemplary flowchart of a method of an emergency assistance requesting system. At S11, the process starts.

At S12, initialization of the EARD 10 happens and the emergency request previously inputted by the requester may be reset.

At S13, the processor/CPU 19 determines whether or not either of an emergency buttons is pressed or selected from the user interface. If the emergency button is pressed or selected by the requester, the process moves to S14. If the emergency button is not pressed or selected by the requester, the EARD 10 keeps on the process S13 until the requester presses or selects the emergency button.

At S14, the processor/CPU 19 determines which button was pressed or selected by the user from plurality of buttons.

At S15, the processor/CPU 19 controls the communication unit to send an emergency request to an emergency center based on the pressed button. For example, if the button or icon corresponding to the emergency center 1 (12a) was pressed or selected by the requester from the user interface, the processor/CPU 19 controls the communication unit to send an emergency request information to the emergency center 1(11*a*).

At S16, the processor/CPU 19 controls the communication unit to send an EARD's geographical location information to the emergency center determined to be pressed or selected by the requester. For example, if the button or icon corresponding to the emergency center 1 (12*a*) was pressed or selected by the requester from the user interface, the processor/CPU 19 controls the communication unit to send the geographical location information, which was preset or preprogrammed in the memory 20 or obtained by GPS module 15, to the emergency center 1 (11*a*).

At S17, the processor/CPU 19 controls the communication unit to send additional information depending on the nature of the emergency center determined to be pressed or selected by the requester at S14. For example, if the button or icon corresponding to an emergency medical service was pressed or selected by the requester from the user interface, the processor/CPU 19 controls the communication unit to send information on requester's medical history, requester's physical information or requester's special needs, as additional information, to the emergency medical service. In another example, if the button or icon corresponding to a police department or fire department was pressed or selected by the requester from the user interface, the processor/CPU 19 controls the communication unit to send information on home access methods, codes or community security guard contact information, as additional information, to the police department or the fire department.

At S18, an operator from the emergency center calls back the EARD 10 to confirm the emergency and provide instructions. For example, an operator from the emergency center 1 (11*a*) calls back the EARD 10 by the transceiver 43 and communicates with the requester to confirm the emergency and provide necessary instructions if any.

At S19, the operator from the emergency center determines whether or not the emergency request from the EARD 10 is valid or not. If the emergency request is determined to be invalid, the operator inputs from the user interface (e.g., keyboard 32) the information that the request from the EARD 10 is invalid. Based on the input from the operator, the transceiver 43 sends information indicating that the request was declined to the EARD 10. Then this information is memorized as records of the EARD 10 in the memory 20 and/or memory 40 and the records may affect the reliability index of the EARD 10. If the emergency request is determined to be valid, the operator inputs from the interface (e.g., keyboard 32) the information that the request from the EARD 10 is valid and the process moves to S20.

At S20, for example, the operator may manually determine the closest emergency station to the EARD 10 based on the location of the EARD 10. The processor/CPU 39 may calculate the closest emergency station to the EARD based on the geographical location information received from the EARD 10. The processor/CPU 39 may also determine the emergency center to send the request by calculating which emergency stations satisfy the condition requested by the requester based on the additional information. Then, the processor/CPU 39 controls the transceiver 43 to send the request to the emergency station determined to be contacted.

At S21, the information that the request by the EARD 10 was valid is memorized as records in the memory 20 of EARD 10 and/or memory 40 of EARRD 30 and the records may affect the reliability index of the EARD 10. This information may include any other information related to the request (e.g. information on which of the emergency center was selected by the requester).

At S22, the process ends.

Figure 8:
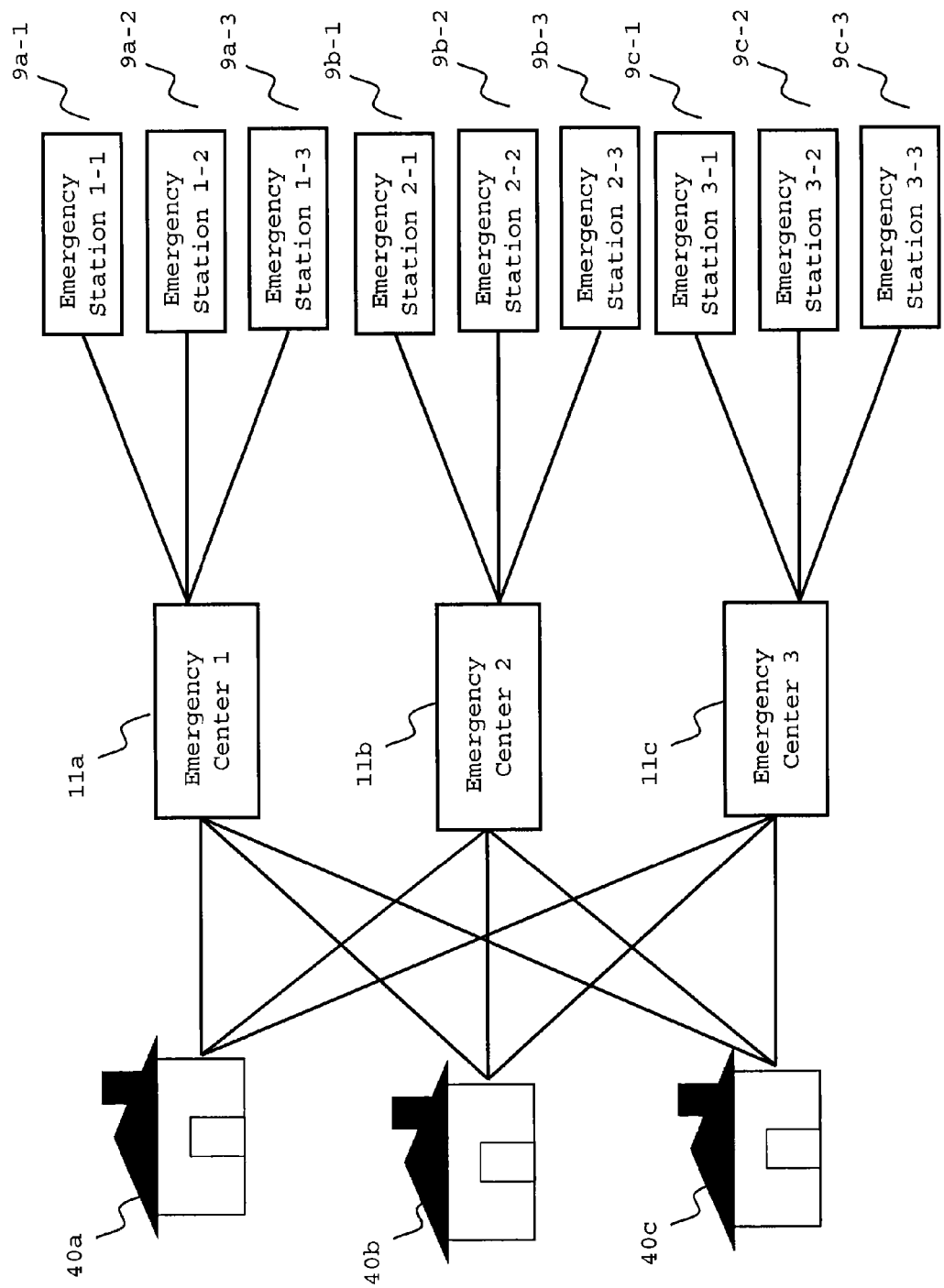
FIG. 8 is an exemplary embodiment of an emergency assistance requesting system.

FIG. 8 is an exemplary embodiment of an emergency assistance requesting system. As shown in FIG. 1, in this example, EARD 10 may be located in the house of a requester who sends emergency assistance request to emergency center 1 (11*a*), 2 (11*b*) and 3 (11*c*). Each requester has his/her own EARD 10 in his/her house 30*a*, 30*b* and 30*c*. Depending on the input by the requester, emergency assistance request is sent to either one or plurality of emergency center 1, 2 and/or 3 through, for example, Internet, telephone lines or wireless links. For example, emergency center 1 (11*a*), 2 (11*b*) and 3 (11*c*) respectively may be a police department, a fire department and an emergency medical. In this example, when the requester living in the house 30*a* pushes a button corresponding to police department, the emergency request goes to emergency center 1 (11*a*). Then, if the operator in emergency center 1 judges the emergency request from the requester is valid after calling back to the requester, the operator sends the request to the closest police station, such as emergency station 1-1 (9*a*-1), based on the location of EARD 10. The operator or the EARRD 30 judges which police station is the closest to the requester's house (30*a*) among plurality of police stations (9*a*-1, 9*a*-2 and 9*a*-3) and sends the request to the closest police station. Then after receiving the request, the police in the police station responds to the request (e.g., the police may go to the requester's house (30*a*)).

Figure 9:
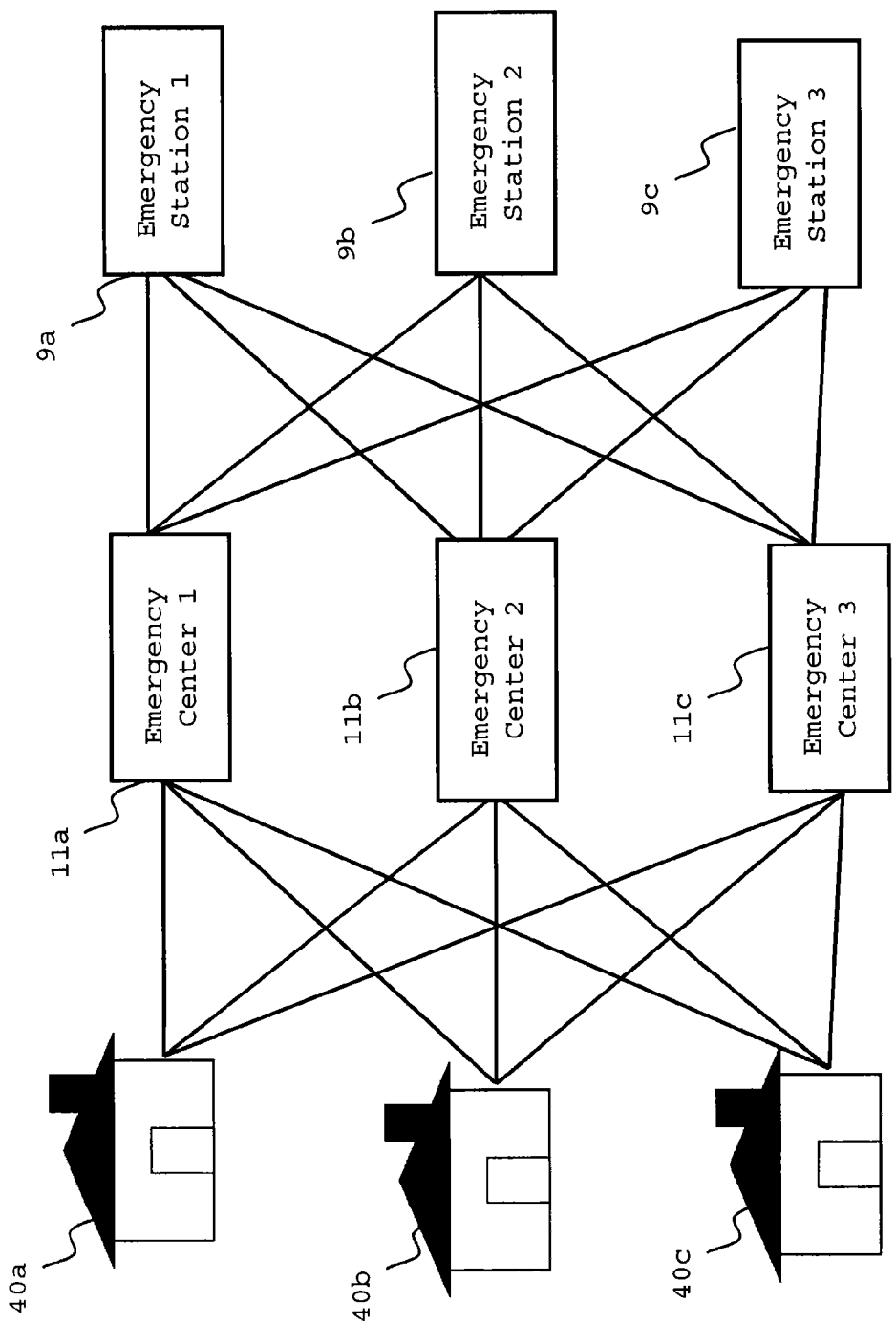
FIG. 9 is another exemplary embodiment of an emergency assistance requesting system.

FIG. 9 is another exemplary embodiment of an emergency assistance requesting system for non-portable use. Requesters may sometimes make a mistake in pushing or selecting a button 12 *a-c*. For example, even though a requestor in the house 30*a* is suffering from a heart attack, he/she may push button 12*a* corresponding to police department (11*a*) by mistake. In this case, after calling back the requester and confirming the emergency, the operator in police department (11*a*) may decide to send the request to the closest hospital (9*c*).

Figure 10:
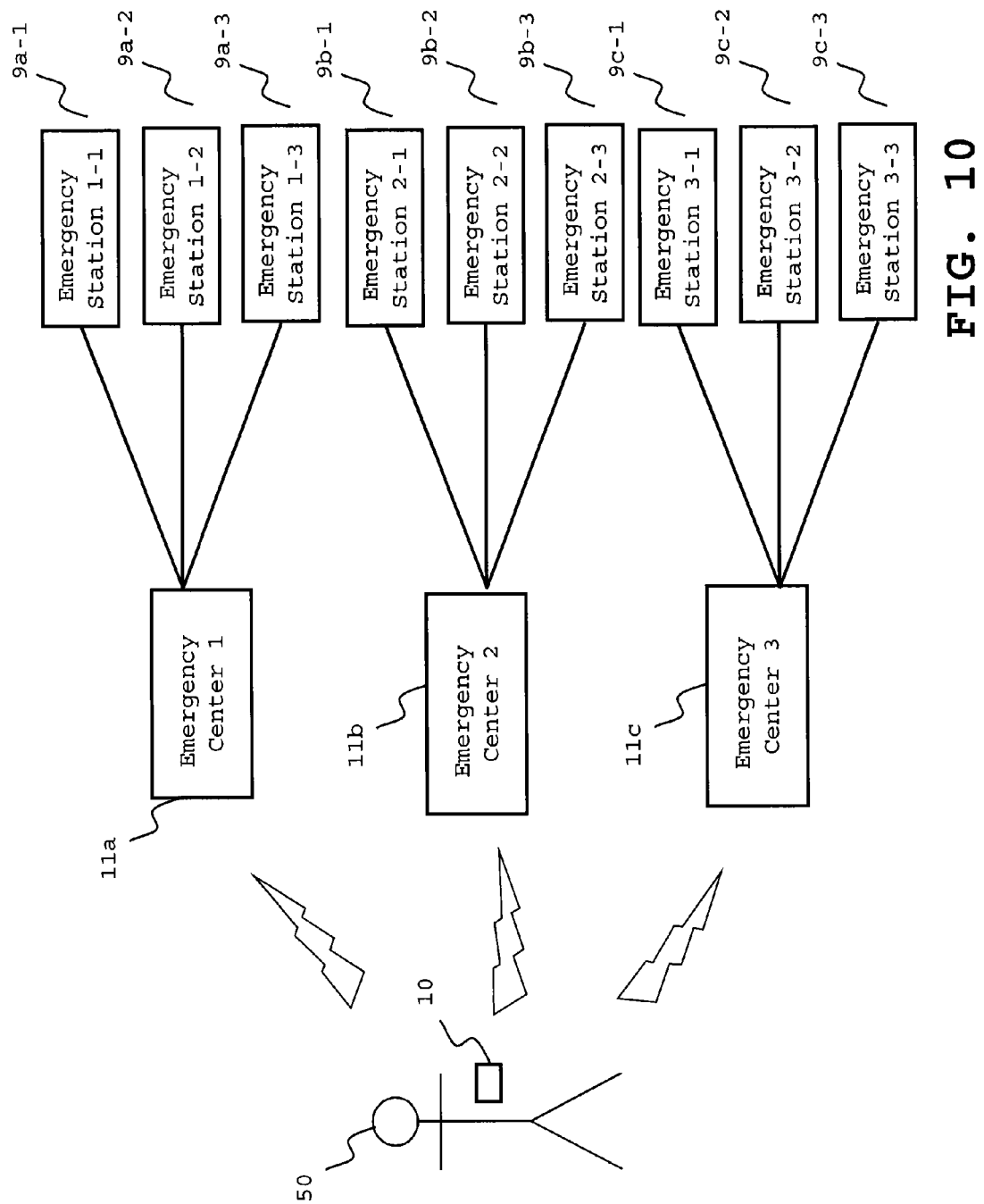
FIG. 10 is an exemplary embodiment of an emergency assistance requesting system.

FIG. 10 is an exemplary embodiment of an emergency assistance requesting system In this example, EARD 10 is for portable use and a requester may carry the EARD 10 with him. When the requester pushes/selects emergency assistance request button 12 of the EARD 10, the request signal is sent to either one or plurality of emergency center 1, 2 and/or 3 through, for example, wireless links. In this example, it is preferable that the EARD 10 includes GPS module 15 to detect the current geographical location of the EARD 10. For example, when the requester carrying the EARD 10 with him pushes/selects a button corresponding to police department, the emergency request goes to emergency center 1 (11*a*). Then, if the operator in emergency center 1 judges the emergency request from the requester is valid after calling back to the requester, the operator sends the request to the closest police station, such as emergency station 1-1 (9*a*-1), based on the location of EARD 10 acquired by the GPS module 15. The operator or the EARRD 30 may judge which police station is the closest to the requester carrying the EARD 10 among plurality of police stations (9*a*-1, 9*a*-2 and 9*a*-3) and send the request to the closest police station. Then after receiving the request, the police in the police station responds to the request (e.g., the police may go to the place where the requester is).

Figure 11:
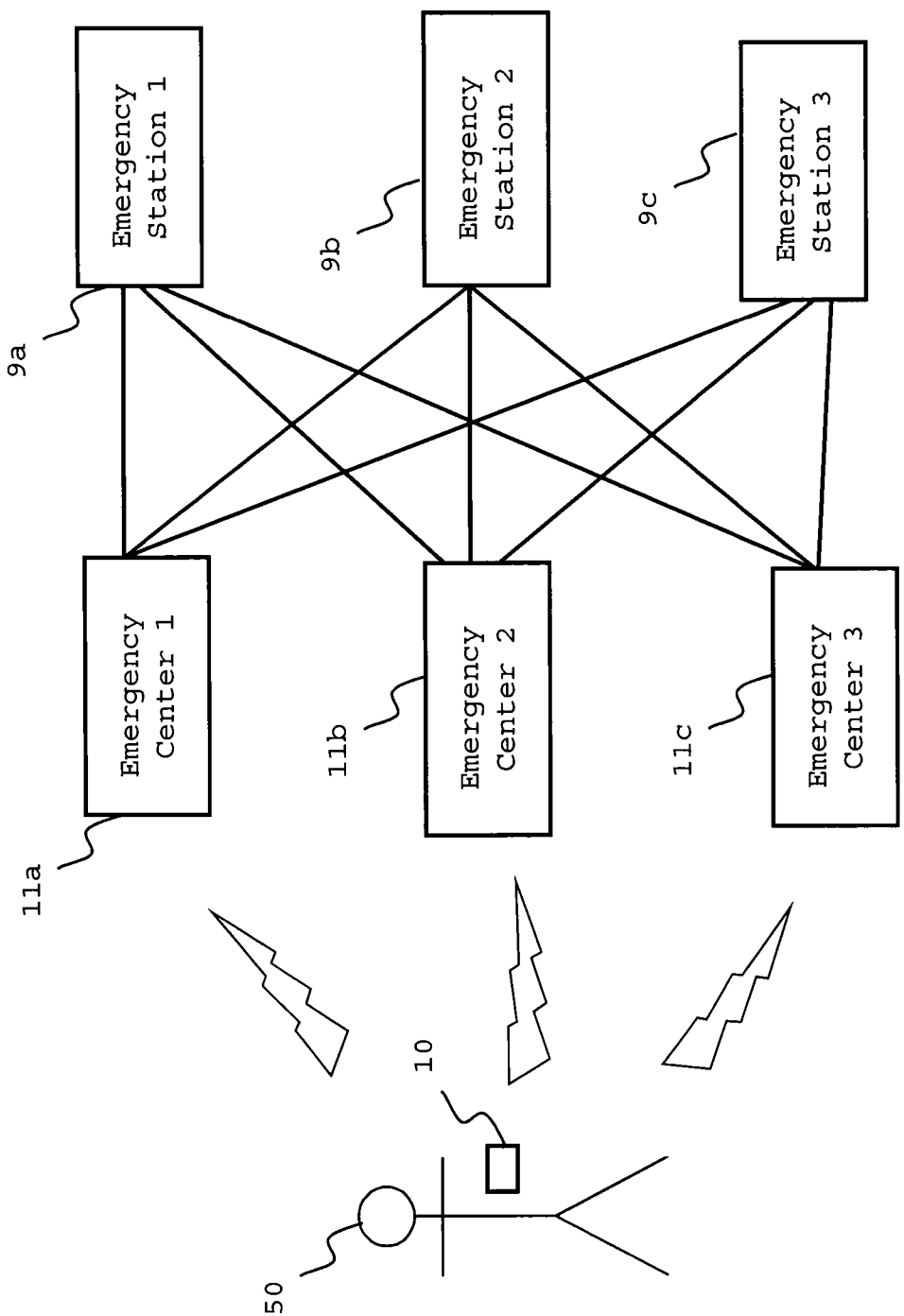
FIG. 11 is another exemplary embodiment of an emergency assistance requesting system.

FIG. 11 is another exemplary embodiment of an emergency assistance requesting system for portable use. Requesters may sometimes make a mistake in pushing or selecting a button 12 *a-c*. For example, even though a requestor carrying the EARD 10 is suffering from a heart attack, he/she may push button 12a corresponding to police department (11a) by mistake. In this case, after calling back to the requester and confirming the emergency, the operator in police department (11a) may decide to send the request to the closest hospital (9c).

In another exemplary embodiment, a requester may set from the user interface a certain condition to send emergency assistance request information automatically to a certain emergency center. For example, parents may set the certain condition such as "When no emergency center button is pushed from 9:00 PM to 12:00 PM, emergency assistance request information is sent to a police department" from the user interface to an EARD 10 and have their children carry the EARD 10. In this way, parents may protect their children from a crime. In another example, the condition may be "When no emergency center button is pushed over 30 minutes when EARD is located within 10 miles from X station". When a certain condition is satisfied, separate from the emergency assistance request, alert information (e.g., an alert message or an alert call) may be sent to a designated recipient who are designated beforehand.

Figure 12:
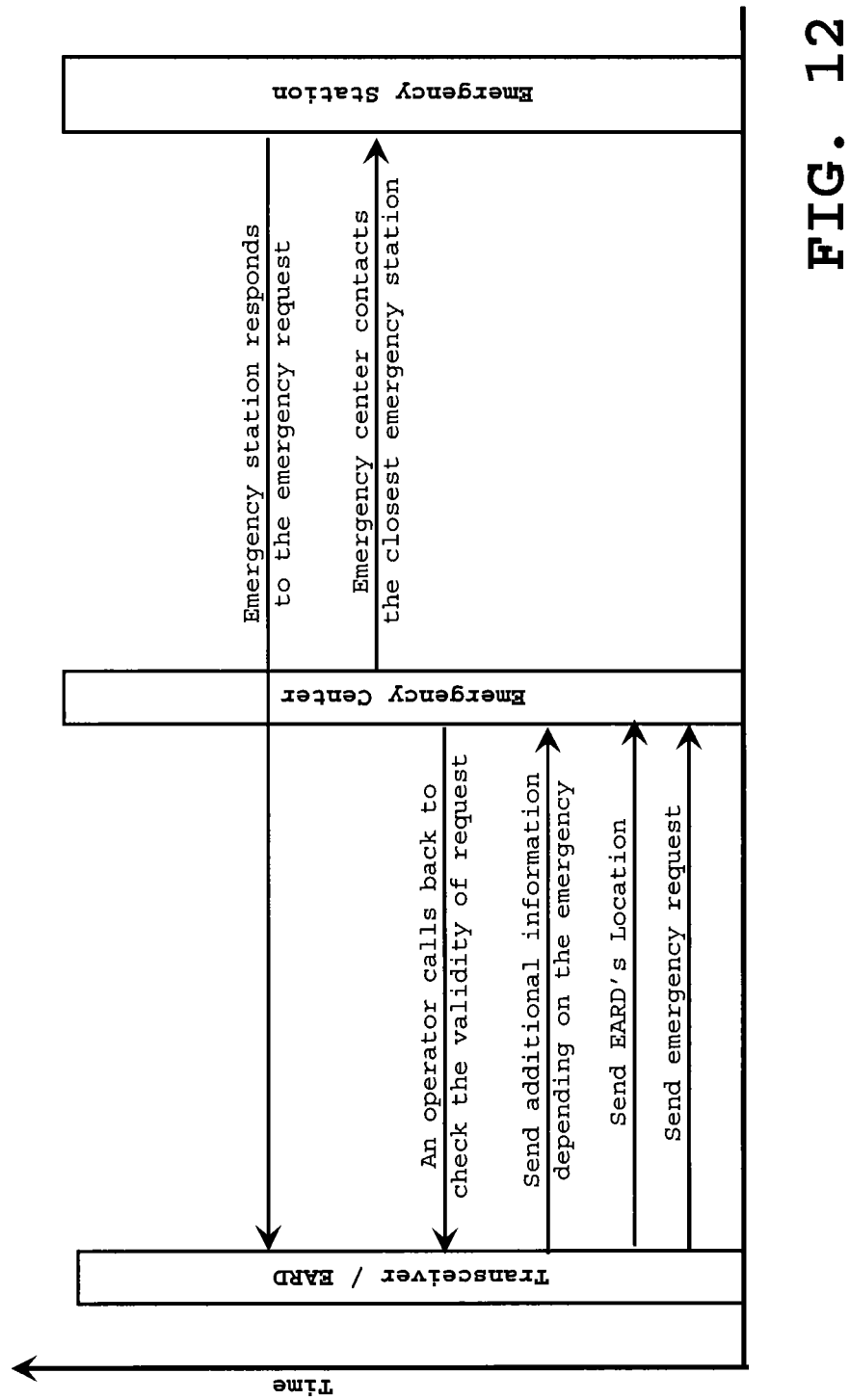
FIG. 12 is an exemplary flowchart of a method of an emergency assistance requesting system.

FIG. 12 is an exemplary flowchart of a method of an emergency assistance requesting system. The vertical line expresses chronological order from bottom to top. For example, when the requester pushes/selects either one of the emergency assistance request buttons 12a, 12b and 12c of the EARD 10, emergency request information is sent from EARD 10 to the emergency center 11 corresponding to the button pushed/selected by the requester. Then, geographical location information of the EARD 10, which is preset/preprogrammed in EARD 10 or detected by GPS module 15, is sent to the emergency center 11. Then, additional information depending on the emergency is sent to the emergency center 11. These emergency request information, geographical information and additional information may also be sent in parallel or serial at practically the same time. Then an operator in the emergency center calls back to the requester to check the validity of the request. The operator may call from the transceiver 43 of the EARRD 30 to the transceiver 23 of the EARD 10. In another example, the operator may call from the phone in the emergency center 11 separate from the EARRD 30 to the phone the requester has separate from the EARD 10. Then if it is judged that the emergency request by the requester is valid by the operator in the emergency center 11, the emergency center 11 contacts the closest emergency station 9. In another example, the emergency center 11 may contacts the emergency station which satisfies the condition requested by the requester based on the additional information. Then the emergency station 9 responds to the emergency request. For example, a police in the police station may go to the requester's house.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An emergency assistance requesting device comprising:
a user interface that is configured to receive an input; a non-transitory storage device that stores emergency request information, geographical location information of the emergency assistance requesting device, information corresponding to plurality of emergency centers, a user profile, and history data;
processing circuitry that is configured to
determine an emergency center from a plurality of emergency centers to communicate with based on the input from the user interface, the user profile, and the history data, wherein the user profile includes priority information about a requester, and the history data includes a confidence level regarding whether a request message is to be sent in response to receiving said input,
retrieve, from the non-transitory storage device, the emergency request information, the geographical location information of the emergency assistance requesting device, the information corresponding to the emergency center determined to communicate with, the user profile and the history data, and
determine whether the confidence level is above a predetermined level, and if above the predetermined level transmit the emergency request information, the geographical location information, the information corresponding to the emergency center determined to communicate with, the user profile and the history data to the emergency center determined to communicate with, and if the confidence level is below the predetermined level, transmit a different message to a designated recipient that is not the emergency center determined to communicate with~
wherein the processing circuitry calculates the confidence level as a function of a number of false requests made by the requester, a weight of the false requests, a number of mistake requests made by the requester, a weight of mistake requests, a number of non-emergency requests made by the requester, a weight of non-emergency requests, and a constant number.

2. The emergency assistance requesting device according to claim 1, wherein the geographical location information is preset in the non-transitory storage device.

3. The emergency assistance requesting device according to claim 1,
wherein the processing circuitry detects geographical location data of the emergency assistance requesting device, the geographical location data being stored as the geographical location information in the non-transitory storage device.

4. The emergency assistance requesting device according to claim 1, wherein the priority information includes allowable respond time information which represents allowable respond time by the emergency center.

5. The emergency assistance requesting device according to claim 1, wherein the processing circuitry calculates the confidence level based on confidence level=$k/\{(x^*wx+y^*wy+z^*wx)+1\}$, where x is the number of false requests made by the requester, wx is the weight of the false requests, y is the number of mistake requests made by the requester, wy is the weight of mistake requests, z is the number of non-emergency requests made by the requester, wz the is weight of non-emergency requests, and k is the constant number.

6. The emergency assistance requesting device according to claim 1, wherein the user interface comprises a microphone, and the processing circuitry turns on the microphone if the processing circuitry receives the input from the user interface.

7. The emergency assistance requesting device according to claim 1, wherein the user interface is configured to receive a condition information, and the processing circuitry is configured to transmit the emergency request information, the geographical location information, the information corresponding to the emergency center determined to communicate with, the user profile and the history data to the emergency center determined to communicate with automatically when the condition is satisfied.

8. The emergency assistance requesting device according to claim 7, wherein the user interface is configured to receive recipient information and the processing circuitry is configured to send alert information to the recipient when the condition is satisfied.

9. The emergency assistance requesting device of according to claim 1, wherein the plurality of emergency centers are any combination of a police department, a fire department and an emergency medical service.

10. The emergency assistance requesting device according to claim 9, wherein the information corresponding to the police department or the fire department includes either one or combination of (1) home access method information and (2) community security guard contact information.

11. The emergency assistance requesting device according to claim 9, wherein the information corresponding to the emergency medical service comprises either one or combination of (1) the requester's medical history, (2) the requester's physical information and (3) the requester's special needs.

12. A method for requesting an emergency assistance using an emergency assistance requesting device, the method comprising the steps of: receiving an input; determining with processing circuitry an emergency center to communicate with from a plurality of emergency centers based on the input to the emergency assistance requesting device, a user profile, and history data, wherein the user profile includes priority information about a requester, and the history data includes a confidence level regarding whether a request message is to be sent in response to receiving;
retrieving, from a non-transitory storage device in the emergency assistance requesting device, emergency request information, geographical location information of the emergency assistance requesting device, information corresponding to the emergency center determined to communicate with, the user profile, and the history data; and determining whether the confidence level is above a predetermined level and if so transmit the emergency request information, the geographical location, the information corresponding to the emergency center determined to communicate with, the user profile, and the history data to the emergency center determined to communicate with, and if the confidence level is below the predetermined level, transmit a different message to a designated recipient that is not the emergency center determined to communicate with,
wherein the processing circuitry calculates the confidence level as a function of a number of false requests made by the requester, a weight of the false requests, a number of mistake requests made by the requester, a weight of mistake requests, a number of non-emergency requests made by the requester, a weight of non-emergency requests and a constant number.

13. The method according to claim 12, further comprising:
receiving a condition information; and
transmitting the emergency request information, the geographical location information, the information corresponding to the emergency center determined to communicate with, the user profile and the history data to the emergency center determined to communicate with automatically when the condition is satisfied.

14. The method according to claim 12, wherein the plurality of emergency centers are any combination of a police department, a fire department and an emergency medical service, and the information corresponding to the police department or the fire department includes either one or combination of home access method information and community security guard contact information, and the information corresponding to the emergency medical service comprises either one or combination of the requester's medical history, the requester's physical information and the requester's special needs.

15. The method according to claim 12, wherein the priority information includes allowable response time information which represents allowable response time by the emergency center.

16. The method according to claim 12, wherein the confidence level is calculated by the processing circuitry based on confidence level=$k/\{(x*wx+y*wy+z*wx)+1\}$, where x is the number of false requests made by the requester, wx is the weight of the false requests, y is the number of mistake requests made by the requester, wy is the weight of mistake requests, z is the number of non-emergency requests made by the requester, wz is the weight of non-emergency requests, and k is the constant number.

17. A non-transitory computer readable medium including executable instructions, which cause processing circuitry to execute a method for requesting an emergency assistance using an emergency assistance requesting device, the method comprising:
receiving an input; determining with the processing circuitry an emergency center to communicate with from a plurality of emergency centers based on the input to the emergency assistance requesting device, a user profile, and history data, wherein the user profile includes priority information about a requester, and the history data includes a confidence level regarding whether a request message is to be sent in response to receiving;
retrieving, from a non-transitory storage device in the emergency assistance requesting device, emergency request information, geographical location information of the emergency assistance requesting device, information corresponding to the emergency center determined to communicate with, the user profile, and the history data; and determining whether the confidence level is above a predetermined level and if so transmit the emergency request information, the geographical location, the information corresponding to the emergency center determined to communicate with, the user profile, and the history data to the emergency center determined to communicate with, and if the confidence level is below the predetermined level, transmit a different message to a designated recipient that is not the emergency center determined to communicate with,
wherein the confidence level is calculated as a function of a number of false requests made by the requester, a weight of the false requests, a number of mistake requests made by the requester, a weight of mistake requests, a number of non-emergency requests made by the requester, a weight of non-emergency requests, and a constant number.

18. The non-transitory computer readable medium according to claim 17, wherein the method further comprising the steps of:
receiving a condition information; and
transmitting the emergency request information, the geographical location information, the information corresponding to the emergency center determined to communicate with, the user profile and the history data to the emergency center determined to communicate with automatically when the condition is satisfied.

19. The non-transitory computer readable medium according to claim 17, wherein the priority information includes allowable respond time information which represents allowable respond time by the emergency center.

20. The non-transitory computer readable medium according to claim 17, wherein the confidence level is calculated based on confidence level=$k/\{(x*wx+y*wy+z*wx)+1\}$, where x is the number of false requests made by the requester, wx is the weight of the false requests, y is the number of mistake requests made by the requester, wy is the weight of mistake requests, z is the number of non-emergency requests made by the requester, wz is the weight of non-emergency requests, and k is the constant number.

* * * * *